United States Patent
Quinn et al.

(10) Patent No.: US 8,632,096 B1
(45) Date of Patent: Jan. 21, 2014

(54) SYSTEMS AND METHODS FOR HAND WHEEL TORSIONAL VIBRATION ATTENUATION

(71) Applicant: GM Global Technology Operations LLC, Detroit, MI (US)

(72) Inventors: Shawn G. Quinn, Grand Blanc, MI (US); David P. Hamilton, Clarkston, MI (US); Mark A. Stebbins, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/650,536

(22) Filed: Oct. 12, 2012

(51) Int. Cl.
 *B62D 1/06* (2006.01)
 *B62D 1/11* (2006.01)
(52) U.S. Cl.
 USPC ........... 280/771; 74/552; 188/267.1; 188/378
(58) Field of Classification Search
 USPC .................... 280/771, 779; 188/267.1, 267.2, 188/378–380; 74/492, 493, 552
 IPC ..................................... B62D 1/06; B62D 1/04
 See application file for complete search history.

(56) References Cited

U.S. PATENT DOCUMENTS

| | | | | |
|---|---|---|---|---|
| 6,736,423 B2 * | 5/2004 | Simonian et al. | ............. | 280/731 |
| 6,976,403 B2 * | 12/2005 | Oblizajek et al. | ............... | 74/552 |
| 7,226,082 B2 * | 6/2007 | Muramatsu et al. | ........... | 280/775 |
| 7,316,419 B2 * | 1/2008 | Fischer | .......................... | 280/779 |
| 7,562,904 B2 * | 7/2009 | Gustavsson | .................... | 280/779 |
| 2002/0124683 A1 * | 9/2002 | Kreuzer et al. | .................. | 74/552 |
| 2002/0125084 A1 * | 9/2002 | Kreuzer et al. | ............ | 188/267.1 |
| 2002/0185347 A1 * | 12/2002 | Pohl et al. | ................... | 188/267.1 |
| 2004/0084887 A1 * | 5/2004 | Loh et al. | ....................... | 280/779 |
| 2005/0167966 A1 * | 8/2005 | Fischer | .......................... | 280/779 |
| 2007/0137415 A1 * | 6/2007 | Thomas | .......................... | 74/552 |
| 2009/0183959 A1 * | 7/2009 | Klit et al. | ................... | 188/267.1 |
| 2011/0017556 A1 * | 1/2011 | Maranville et al. | ......... | 188/267.2 |

OTHER PUBLICATIONS

Quinn, Shawn G., et al., Systems and Methods for Hand Wheel Translational Vibration Attenuation, U.S. Appl. No. 13/650,541, filed Oct. 12, 2012.

* cited by examiner

*Primary Examiner* — Ruth Ilan
(74) *Attorney, Agent, or Firm* — Ingrassia Fisher & Lorenz, P.C.

(57) ABSTRACT

Methods and apparatus are provided for attenuating torsional vibration of a steering system. The apparatus can include a housing including a chamber. The housing can be couplable to a rim of a hand wheel of the steering system. The apparatus can include a mass disposed in the chamber of the housing. The mass can have a fixed stiffness. The apparatus can also include a damping fluid disposed in the chamber of the housing. The damping fluid can have a variable stiffness. The apparatus can include a control module that determines a torsional vibration experienced by the steering system and outputs a signal to vary the stiffness of the damping fluid in response to the torsional vibration in substantially real-time.

16 Claims, 5 Drawing Sheets

SYSTEMS AND METHODS FOR HAND WHEEL TORSIONAL VIBRATION ATTENUATION

TECHNICAL FIELD

The present disclosure generally relates to vibration attenuation and more particularly relates to systems and methods for steering or hand wheel torsional vibration attenuation.

BACKGROUND

Generally, a motor vehicle can be operated over wide range of conditions. For example, the motor vehicle can be operated over smooth roads or uneven terrain. In the example of smooth road operation, such as when the motor vehicle is operated on a highway at highway speeds, due to imbalances in the roadway wheels, torsional vibration of the steering or hand wheel may be experienced by the operator of the vehicle.

Accordingly, it is desirable to attenuate torsional vibration experienced by the operator at the hand wheel. Furthermore, other desirable features and characteristics of the present invention will become apparent from the subsequent detailed description and the appended claims, taken in conjunction with the accompanying drawings and the foregoing technical field and background.

SUMMARY

An apparatus is provided for attenuating torsional vibration of a steering system. In one embodiment, the apparatus can include a housing including a chamber. The housing can be couplable to a rim of a hand wheel of the steering system. The apparatus can include a mass disposed in the chamber of the housing. The mass can have a fixed stiffness. The apparatus can also include a damping fluid disposed in the chamber of the housing. The damping fluid can have a variable stiffness. The apparatus can include a control module that determines a torsional vibration experienced by the steering system and outputs a signal to vary the stiffness of the damping fluid in response to the torsional vibration in substantially real-time.

A method is provided for attenuating torsional vibration of a steering system. In one embodiment, the method can include receiving accelerometer data associated with the steering system, and based on the accelerometer data, determining an amount of torsional vibration experienced near a hand wheel of the steering system. The method can also include adjusting a damping and a stiffness of a vibration attenuation system coupled to a rim of the hand wheel based on the accelerometer data.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
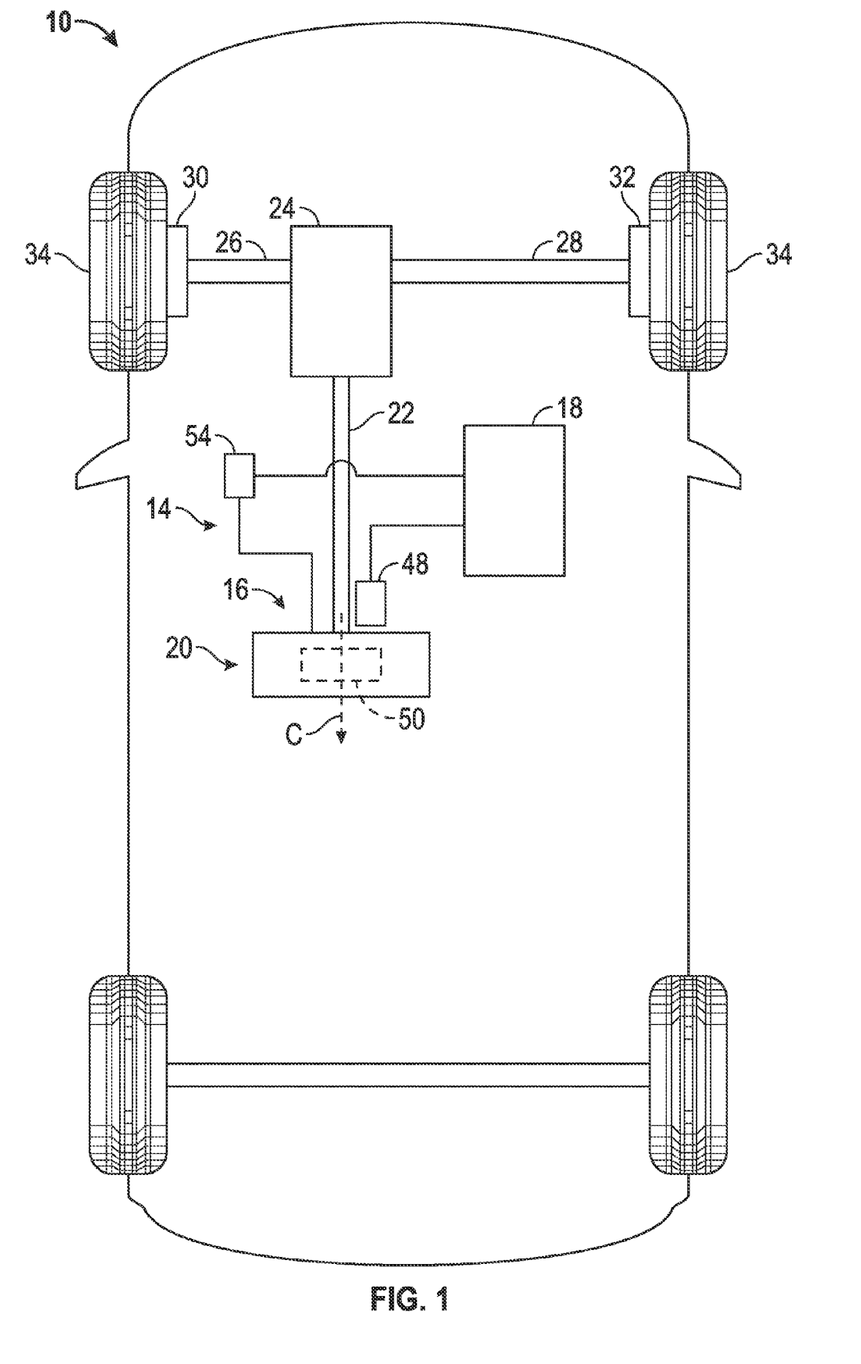
FIG. 1 is a functional block diagram illustrating a vehicle that includes a hand wheel having a torsional vibration attenuation system in accordance with an embodiment.

With reference to FIG. 1, a vehicle 10 is shown. The vehicle 10 can include a steering system 14, a vibration attenuation system 16 and a control module 18. As will be discussed in greater detail herein, the control module 18 can receive inputs from the steering system 14 to control the operation of the vibration attenuation system 16. The vibration attenuation system 16 can dampen the torsional vibration experienced by an operator of the vehicle 10 at the steering system 14.

Generally, the steering system 14 can include a steering or a hand wheel 20 coupled to a steering shaft 22. It should be noted that the use of a hand wheel is merely exemplary, as the steering system 14 can include any suitable user input device for steering the vehicle 10, including, but not limited to, a joystick, the hand wheel 20, etc. In one exemplary embodiment, the steering system 14 can comprise an electric power steering (EPS) system, which can include a steering assist unit 24. The steering assist unit 24 can be coupled to the steering shaft 22 of the steering system 14 and to tie rods 26, 28 of the vehicle 10. It should be noted that the steering shaft 22 as described and illustrated herein can include, but is not limited to, a steering column coupled to an intermediate shaft, or any suitable mechanism that couples the hand wheel 20 to the steering assist unit 24 known in the art. The steering assist unit 24 can include, for example, a rack and pinion steering mechanism (not shown) that can be coupled through the steering shaft 22 to a steering actuator motor and gearing. During operation, as the hand wheel 20 is turned by a vehicle operator, a motor of the steering assist unit 24 provides the assistance to move the tie rods 26, 28, which in turn moves steering knuckles 30, 32, respectively. The steering knuckles 30, 32 can be coupled to respective roadway wheels 34 of the vehicle 10. Although an EPS system is illustrated in FIG. 1 and described herein, it is appreciated that the steering system 14 can include various controlled steering systems such as steering systems with hydraulic configurations, steer by wire configurations, non-assisted steering systems, etc.

Figure 2:
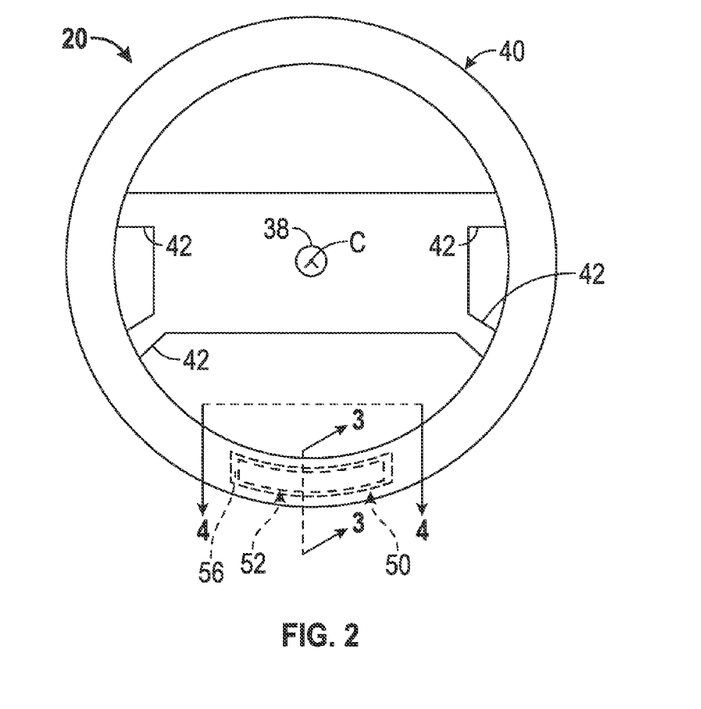
FIG. 2 is a schematic front view of the hand wheel of FIG. 1 in accordance with an embodiment.

With reference to FIG. 2, the hand wheel 20 can include a hub 38 and a rim 40. The hub 38 can be positioned about a center line C of the hand wheel 20, and can couple the hand wheel 20 to the steering shaft 22. The rim 40 can extend about a perimeter or circumference of the hand wheel 20 and can be coupled to the hub 38 via one or more spokes 42. In one example, with reference to FIG. 3, the rim 40 can have a frame 41 with a generally U-shape, which can define a cavity 44 for receipt of a portion of the vibration attenuation system 16. The rim 40, including a portion of the vibration attenuation system 16, can be substantially encased in a covering 46. The covering 46 can include, but is not limited to, one or more of a polymer, leather, textile, etc., which can make the hand wheel 20 aesthetically pleasing for the operator.

With continued reference to FIG. 1, the steering system 14 can also include a steering sensor 48. The steering sensor 48 can be coupled to the steering shaft 22, the hand wheel 20 or other location of the steering system 14. For example, the steering sensor 48 could be coupled to the hub 38 of the hand wheel 20. The steering sensor 48 can include an accelerometer, such as a translational or angular accelerometer. In one example, the steering sensor 48 can measure the acceleration of the steering shaft 22 and can generate accelerometer signals based thereon. It should be noted that although the steering sensor 48 is described and illustrated herein as being separate and discrete from the steering assist unit 24, the steering sensor 48 could be integrated with the steering assist unit 24 to assist in steering the vehicle 10, if desired. When coupled to the steering shaft 22, the steering sensor 48 can observe the torsional or angular movement of the steering shaft 22 in response to vibration. In this regard, imbalances in the roadway wheels 34 can cause torsional vibration during smooth road driving conditions, which can be felt by the operator through the steering system 14. The angular acceleration of the steering shaft 22 can indicate the amount of torsional vibration experienced by the steering shaft 22, and thus, the operator of the vehicle 10.

With reference to FIGS. 1 and 2, the vibration attenuation system 16 can be coupled to the steering system 14 so as to be substantially offset from the center line C of the hand wheel 20 and can be in communication with the control module 18 (FIG. 1). In this example, with reference to FIG. 2, the vibration attenuation system 16 can be coupled to the rim 40 of the hand wheel 20. It should be noted, however, that the vibration attenuation system 16 can be coupled to the steering shaft 22 or any other suitable portion of the steering system 14 to attenuate or dampen the torsional vibration experienced by the steering system 14. The vibration attenuation system 16 can reduce the frequency response function at the hand wheel 20 when compared to a hand wheel 20 without the vibration attenuation system 16.

The vibration attenuation system 16 can include a housing 50, a damping mass system 52 (FIG. 2) and a power supply 54 (FIG. 1). The housing 50 can be sized to be coupled to the rim 40 of the hand wheel 20. It should be noted that the location of the housing 50 in the rim 40 illustrated in FIG. 2 is merely exemplary, as the housing 50 could be located at any desired location along the rim 40, and can be coupled to the spoke 42. In one example, the housing 50 can have a shape that corresponds to the cavity 44 of the hand wheel 20. The housing 50 can substantially contain the damping mass system 52. It should be noted that although the use of a housing 50 is illustrated and described herein to contain the damping mass system 52, the damping mass system 52 can be contained substantially within the rim 40 of the hand wheel 20 without the use of a housing, if desired. The housing 50 can define at least one chamber 56. The chamber 56 can receive the damping mass system 52.

Figure 3:
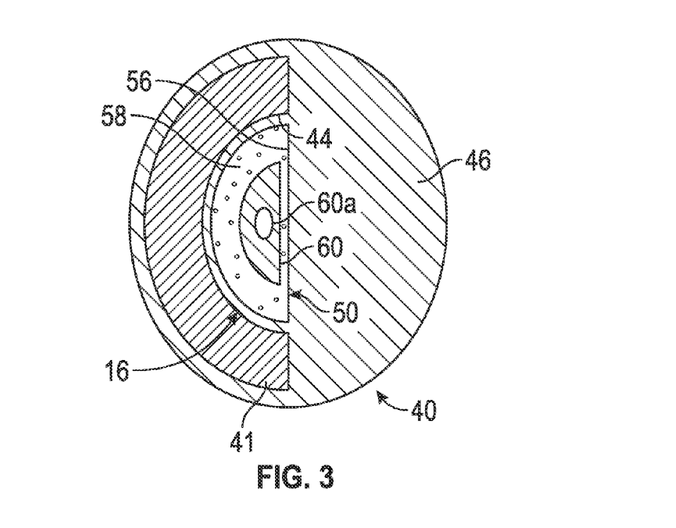
FIG. 3 is a cross-sectional view of the hand wheel of FIG. 2, taken along line 3-3 of FIG. 2, in accordance with an embodiment.
Figure 4:
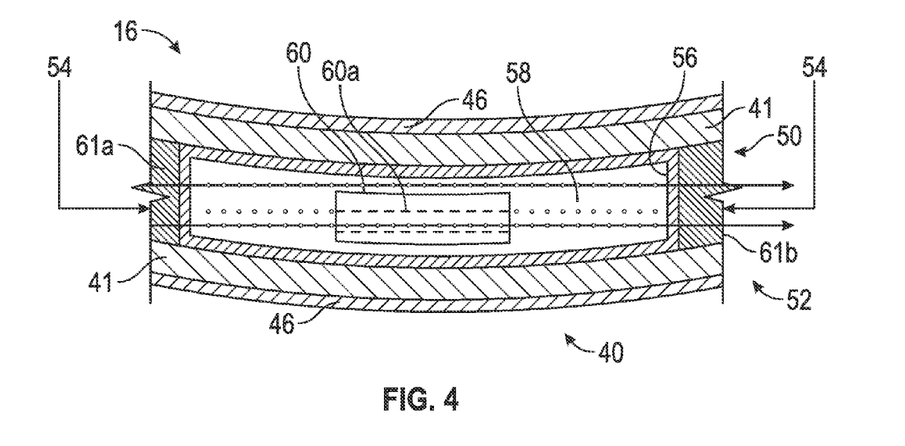
FIG. 4 is a cross-sectional view of the hand wheel of FIG. 2, taken along line 4-4 of FIG. 2, in accordance with an embodiment.

With reference to FIGS. 3 and 4, the damping mass system 52 can include a damping fluid 58, a mass 60 and one or more plates 61. In one example, the damping fluid 58 can include, but is not limited to, a magneto-rheological fluid, which can be in communication with the power supply 54 (FIG. 1). Generally, the viscosity of a magneto-rheological fluid can vary based upon the application of a magnetic flux. In this regard, the magneto-rheological fluid can include magnetically responsive particles, including, but not limited to, iron particles, which can be suspended in a carrier fluid. Without a magnetic flux present, the magnetically responsive particles can be orientated randomly in the carrier fluid. Upon the application of a magnetic flux, the orientation of the magnetically responsive particles can be linear, in the direction of the magnetic flux field (FIG. 4). The linear orientation of the magnetically responsive particles can change or increase the viscosity of the carrier fluid, which can cause the carrier fluid to act more as a solid. This can allow the stiffness of the damping mass system 52 to change based on the application of the magnetic flux field.

The amount of magnetic flux applied to the magneto-rheological fluid can be controlled by the control module 18, as will be discussed herein. The use of a magneto-rheological fluid can enable the stiffness of the damping mass system 52 to change with the changes in the viscosity of the magneto-rheological fluid, which can enable substantially real-time adjustment of the damping mass system 52 in response to torsional vibration. Generally, the power supply 54 can receive a signal from the control module 18 to apply an electric current to the damping fluid 58, which can change the viscosity of the damping fluid 58 depending on the torsional vibration experienced by the hand wheel 20. This substantially real-time vibration attenuation can reduce the torsional vibration experienced by the operator of the vehicle 10 at the hand wheel 20.

The mass 60 can be received within the chamber 56 of the housing 50, and can be substantially submersed in the damping fluid 58. In one example, the mass 60 can float within the damping fluid 58, however, the mass 60 can also be coupled to the chamber 56 of the housing 50 so as to be stationary within the damping fluid 58. The mass 60 can include a throughbore 60a. The throughbore 60a can enable the damping fluid 58 to flow through the mass 60. It should be noted that the damping fluid 58 can also flow about the mass 60. The mass 60 can provide a fixed amount of damping for the steering system 14. In this regard, the mass 60 can be selected to have a weight that provides a predetermined amount of damping or attenuation that corresponds to a predetermined roadway wheel 34 imbalance. Thus, the damping fluid 58 can provide a variable amount of damping, which can be tuned substantially in real-time in response to torsional vibration experienced at various roadway wheel imbalances, while the mass 60 can provide a fixed amount of damping for a predetermined roadway wheel imbalance.

The plates 61 can be disposed on substantially opposite ends of the housing 50. In one example, the plates 61 can include a first plate 61a and a second plate 61b. As schematically illustrated in FIG. 4, the plates 61a, 61b can in communication with the power supply 54, and can be used to apply a magnetic flux field to the damping fluid 58. The application of the magnetic flux field can cause the damping fluid 58 to change viscosity, thereby changing the stiffness of the damping fluid 58. It should be noted that the plates 61a, 61b can be in direct communication with the controller 18, if desired.

With reference back to FIG. 1, the power supply 54 can be in communication with the plates 61a, 61b and can be controlled by the control module 18. The power supply 54 can be any suitable power source capable of supplying a current to the plates 61a, 61b to apply a magnetic flux field to the damping fluid 58 to vary the viscosity of the damping fluid 58 substantially in real-time. In addition, although the power supply 54 is illustrated herein as a separate and discrete component, the power supply 54 could be integrated with other components of the vehicle 10, such as the control module 18.

The control module 18 can control the vibration attenuation system 16 based on signals received from the steering sensor 48 to vary the stiffness of the damping mass system 52. In one example, the control module 18 can control the viscosity of the damping fluid 58 based on signals received from the steering sensor 48.

Figure 5:
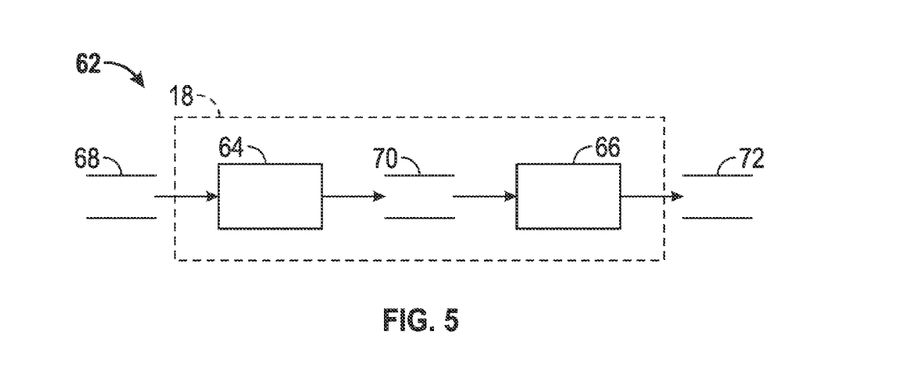
FIG. 5 is a dataflow diagram illustrating a control system of the vibration attenuation system in accordance with an embodiment.

Referring now to FIG. 5, a dataflow diagram illustrates various embodiments of a vibration attenuation control system 62 for the vibration attenuation system 16 (FIG. 1) that may be embedded within the control module 18. Various embodiments of vibration attenuation control systems according to the present disclosure can include any number of sub-modules embedded within the control module 18. As can be appreciated, the sub-modules shown in FIG. 5 can be combined and/or further partitioned to similarly adjust the stiffness of the damping fluid 58 (FIG. 2). Inputs to the system may be sensed from the vehicle 10 (FIG. 1), received from other control modules (not shown), and/or determined/modeled by other sub-modules (not shown) within the control module 18. In various embodiments, the control module 18 includes a vibration control module 64 and a damper control module 66.

The vibration control module 64 can receive as input accelerometer data 68 from the steering sensor 48. Based on the accelerometer data 68, the vibration control module 64 can set vibration data 70 for the damper control module 66. The vibration data 70 can comprise an amount of torsional vibration experienced by the hand wheel 20 during the operation of the vehicle 10 as observed by the steering sensor 48.

The damper control module 66 can receive as input the vibration data 70. Based on the vibration data, the damper control module 66 can output damper data 72. The damper data 72 can comprise an amount of current to be output by the power supply 54 to generate the magnetic flux field to change the viscosity of the damping fluid 58 to the desired stiffness. In this regard, based on the damper data 72, control signals are generated to control the current output by the power supply 54.

Figure 6:
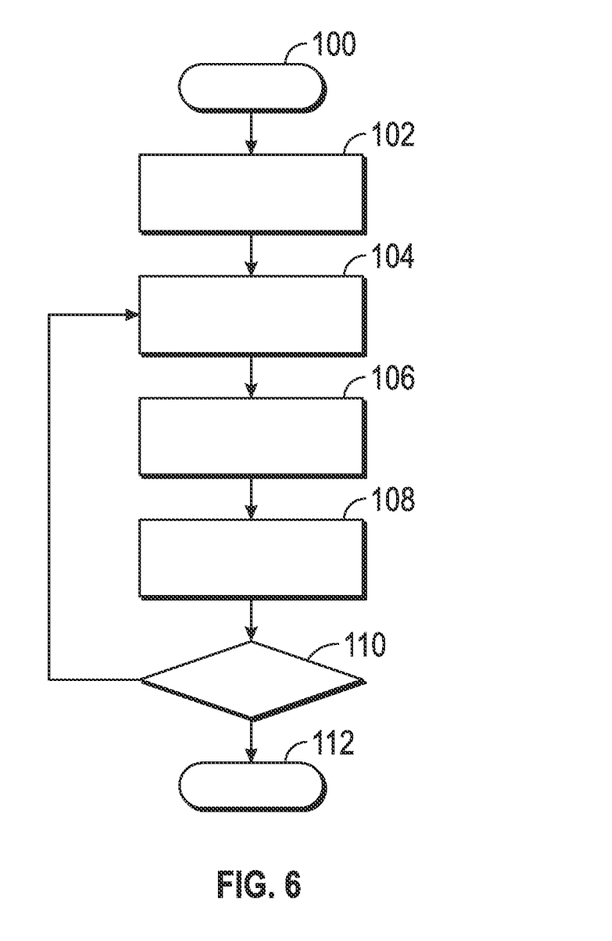
FIG. 6 is a flowchart illustrating a control method of the vibration attenuation system in accordance with an embodiment.

Referring now to FIG. 6, and with continued reference to FIGS. 1-5, a flowchart illustrates a control method that can be performed by the control module 18 of FIG. 1 in accordance with the present disclosure. As can be appreciated in light of the disclosure, the order of operation within the method is not limited to the sequential execution as illustrated in FIG. 6, but may be performed in one or more varying orders as applicable and in accordance with the present disclosure.

In various embodiments, the method can be scheduled to run based on predetermined events, and/or can run continually during operation of the vehicle 10.

The method can begin at 100. At 102, the method can receive accelerometer data 68 from the steering sensor 48. Based on the accelerometer data 68, the method can determine the amount of torsional vibration experienced at the hand wheel 20 at 104. At 106, the method can determine the amount of current needed to adjust the viscosity of the damping fluid 58 to the desired stiffness to attenuate the vibration experienced by the hand wheel 20 and can output the damper data 72 for the power supply 54. Generally, based on the damper data 72, control signals are generated to control the current output by the power supply 54. In one example, the following equations can be solved for the damping coefficient $C_{TVA}$, to determine the amount of damping necessary to attenuate a measured vibration:

$$T = I^* \ddot{\Theta} + (C_T + C_{TTVA})^* \dot{\Theta} - C_{TTVA}^* \dot{\Theta}_{TVA} + (K_T + K_{TTVA})^* \Theta - K_{TTVA}^* \Theta_{TVA} \tag{1}$$

$$T_{TVA} = I_{TVA}^* \ddot{\Theta}_{TVA} - C_{TTVA}^* \dot{\Theta} + (C_T + C_{TTVA})^* \dot{\Theta}_{TVA} - K_{TTVA}^* \Theta + (K_T + K_{TTVA})^* \Theta_{TVA} \tag{2}$$

Wherein T is the torque applied to/by a hand wheel not including the vibration attenuation system 16; I is the inertia of a hand wheel not including the vibration attenuation system 16; $C_T$ is the torsional damping coefficient for a hand wheel not including the vibration attenuation system 16; $K_T$ is the torsional stiffness of a hand wheel not including the vibration attenuation system 16; $\ddot{\Theta}$ is the rotational acceleration of a hand wheel 24 not including the vibration attenuation system 16; $\dot{\Theta}$ is the rotational velocity of a hand wheel not including the vibration attenuation system 16; $\Theta$ is the rotational displacement of a hand wheel not including the vibration attenuation system 16; $T_{TVA}$ is the torque applied to/by a hand wheel including the vibration attenuation system 16; $I_{TVA}$ is the mass of the hand wheel 24 including the vibration attenuation system 16; $C_{TVA}$ is the torsional damping coefficient of the hand wheel 24 including the vibration attenuation system 16; $K_{TVA}$ is the torsional stiffness of the hand wheel 24 including the vibration attenuation system 16; $\ddot{\Theta}_{TVA}$ is the rotational acceleration of a hand wheel 24 including the vibration attenuation system 16; $\dot{\Theta}_{TVA}$ is the rotational velocity of a hand wheel including the vibration attenuation system 16; and $\Theta_{TVA}$ is the rotational displacement of a hand wheel including the vibration attenuation system 16. The values associated with a hand wheel not including the vibration attenuation system 16 can be obtained from a suitable source, including, but not limited to, a look-up table.

At 108, the method can receive accelerometer data 68 from the steering sensor 48. If the hand wheel 20 is still experiencing vibration based on the accelerometer data 68 at 110, then the method can loop to 104. Otherwise, the method can end at 112.

Figure 7:
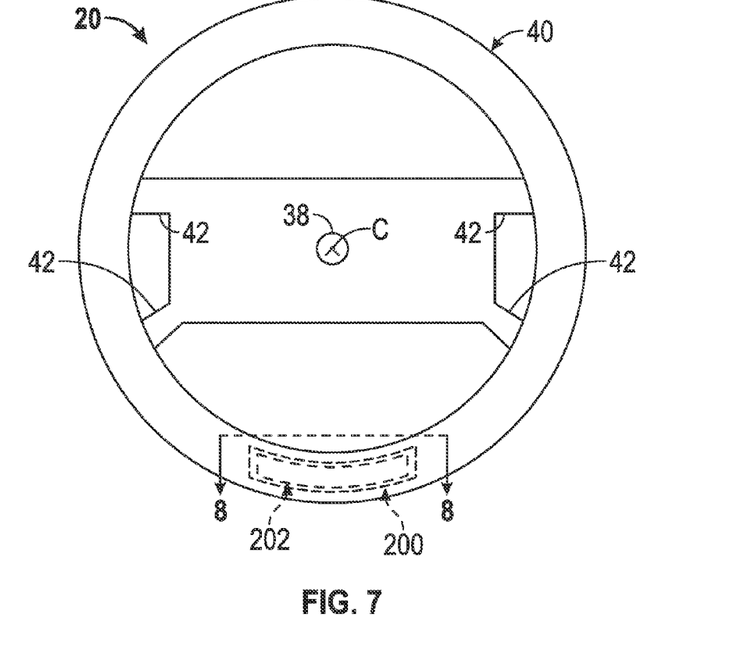
FIG. 7 is a schematic front view of the hand wheel of FIG. 1 in accordance with another embodiment.
Figure 8:
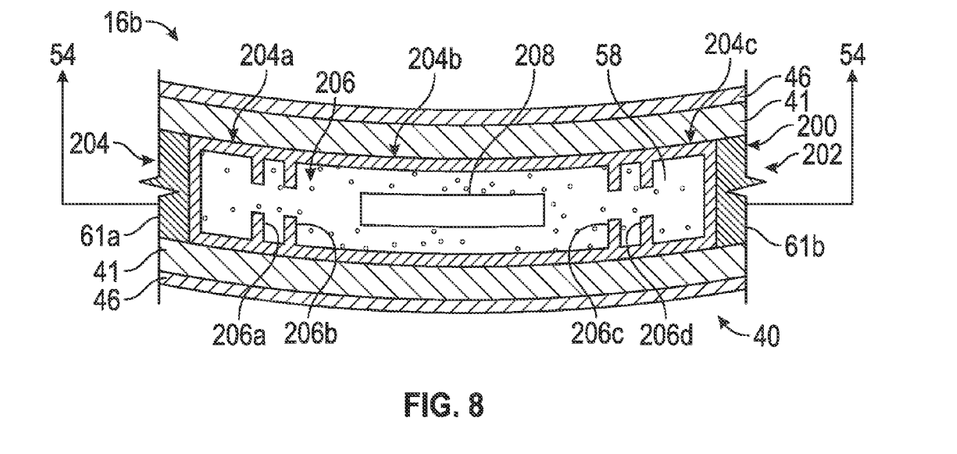
FIG. 8 is a cross-sectional view of the hand wheel of FIG. 7, taken along line 8-8 of FIG. 7, in accordance with another embodiment.

With reference to FIGS. 7 and 8, according to another exemplary embodiment, wherein the same reference numerals are used to denote the same or similar components as those discussed with regard to FIGS. 1-6, the vehicle 10 can include a vibration attenuation system 16b that can be controlled by the control module 18 and coupled to the rim 40 of the hand wheel 20. The vibration attenuation system 16b can include a housing 200, a damping mass system 202 and the power supply 54 (FIG. 1).

The housing 200 can be sized to be coupled to the rim 40 of the hand wheel 20. In one example, the housing 200 can have a shape that corresponds to the cavity 44 of the hand wheel 20. With reference to FIG. 8, the housing 200 can include at least one chamber 204. In one example, the at least one chamber 204 can comprise a first chamber 204a, a second chamber 204b and a third chamber 204c. In this example, the second chamber 204b can be positioned between the first chamber 204a and third chamber 204c. It should be noted that this arrangement of the chambers 204a-c is merely exemplary, as any number of chambers could be used in any desired configuration. Each of the first chamber 204a, second chamber 204b and third chamber 204c can include at least one opening 206 to enable fluid communication between the chambers 204a-c. In one example, the first chamber 204a can include an opening 206a, the second chamber 204b can include an opening 206b and an opening 206c, and the third chamber 204c can include an opening 206d. The fluid communication between the chambers 204a-c can enable a portion of the damping mass system 202 to flow within the housing 200. It should be noted that although the use of a housing 200 is illustrated and described herein to contain the damping mass system 202, the damping mass system 202 could be contained substantially within the rim 40 of the hand wheel 20 without the use of a housing, if desired.

The damping mass system 202 can be received within the housing 200. The damping mass system 202 can include the damping fluid 58, a mass 208 and the one or more plates 61. In one example, the damping fluid 58 can include, but is not limited to, the magneto-rheological fluid. The use of a magneto-rheological fluid can enable the stiffness of the damping mass system 202 to change with the changes in the viscosity of the magneto-rheological fluid, which can enable substantially real-time adjustment of the damping mass system 202 in response to torsional vibration. The damping fluid 58 can be received in the first chamber 204a, second chamber 204b and third chamber 204c, and can flow in the housing 200 between the chambers 204a-c via the openings 206a-d. The plates 61a, 61b can be positioned adjacent to the damping fluid 58, and can be in communication with the power supply 54 (FIG. 1) to apply the magnetic flux field to the damping fluid 58.

The mass 208 can be received within the second chamber 204b of the housing 200, and can be substantially submersed in the damping fluid 58. In one example, the mass 208 can float within the damping fluid 58, however, the mass 208 could also be coupled to the second chamber 204b of the housing 200 so as to be stationary within the damping fluid 58. The mass 208 can provide a fixed amount of damping for the steering system 14. In this regard, the mass 208 can be selected to have a weight that provides a predetermined amount of damping or attenuation that corresponds to a predetermined roadway wheel 34 imbalance. Thus, the damping fluid 58 can provide a variable amount of damping, which can be tuned substantially in real-time in response to torsional vibration experienced at various roadway wheel 34 imbalances, while the mass 208 can provide a fixed amount of damping for a predetermined roadway wheel 34 imbalance.

As the control module 18 can control the vibration attenuation system 16b in substantially the same method as that described with regard to the vibration attenuation system 16 in FIGS. 1-6, the control method performed by the control module 18 for the vibration attenuation system 16b will not be discussed in great detail herein. Briefly, however, the control module 18 can control the vibration attenuation system 16b based on signals received from the steering sensor 48 to vary the stiffness of the damping mass system 202. In one example, the control module 18 can control the viscosity of the damping fluid 58 based on signals received from the steering sensor 48.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for attenuating torsional vibration of a steering system, comprising:
    a housing including a chamber, the housing couplable to a rim of a hand wheel of the steering system;
    a mass disposed in the chamber of the housing, the mass having a fixed stiffness;
    a damping fluid disposed in the chamber of the housing and having a variable stiffness; and
    a control module that determines a torsional vibration experienced by the steering system and outputs a signal to vary the stiffness of the damping fluid in response to the torsional vibration in substantially real-time,
    wherein the housing further comprises:
    a first chamber having a first opening;
    a second chamber having a second opening and a third opening; and
    a third chamber having a fourth opening,
    wherein the damping fluid is received in the housing and flows between the first chamber, second chamber and third chamber via the first opening, second opening, third opening and fourth opening.

2. The system of claim 1, wherein the second chamber is positioned between the first chamber and the third chamber.

3. The system of claim 2, wherein the mass is disposed wholly within the second chamber.

4. The system of claim 1, wherein the mass further comprises a passage defined through the mass to enable the damping fluid to flow through the mass.

5. The system of claim 1, wherein the damping fluid is a magneto-rheological fluid.

6. The system of claim 5, further comprising:
    a power supply in communication with one or more plates positioned adjacent to the damping fluid and the control module that receives the signal from the control module to vary the stiffness of the damping fluid by varying a current applied to the one or more plates.

7. The system of claim 1, further comprising:
    an angular accelerometer coupled to a steering shaft of the steering system that provides the control module with accelerometer data, and the control module determines the torsional vibration experienced at the hand wheel based on the accelerometer data.

8. The system of claim 1, wherein the rim of the hand wheel is offset from a center line of the hand wheel.

9. A vehicle, comprising:
    a steering system that includes a hand wheel and a steering shaft, the hand wheel having a hub and a rim disposed about the hub so as to form a perimeter of the hand wheel, the rim coupled to the hub via a spoke;
    a vibration attenuation system disposed within a housing coupled to the rim, the housing including at least a first chamber in communication with a second chamber, and the vibration attenuation system including:
        a magneto-rheological damping fluid disposed in the housing so as to flow between the first chamber and the second chamber; and
        a mass movable within the damping fluid and disposed in the second chamber,
    wherein the viscosity of the damping fluid is adjustable based upon an amount of torsional vibration experienced at the hand wheel.

10. The vehicle of claim 9, further comprising:
a control module that determines the amount of torsional vibration experienced at the hand wheel and adjusts the viscosity of the damping fluid based on the amount of torsional vibration.

11. The vehicle of claim 10, further comprising:
an angular accelerometer coupled to the steering shaft that provides the control module with accelerometer data, and the control module determines the torsional vibration experienced at the hand wheel based on the accelerometer data.

12. The vehicle of claim 11, wherein the first chamber has a first opening, the second chamber has a second opening and a third opening, and the housing further comprises:
a third chamber having a fourth opening,
wherein the damping fluid flows between the first chamber, second chamber and third chamber via the first opening, second opening, third opening and fourth opening.

13. The vehicle of claim 12, wherein the mass is contained wholly within the second chamber.

14. A method of attenuating torsional vibration of a steering system, comprising:
receiving accelerometer data associated with the steering system;
based on the accelerometer data, determining an amount of torsional vibration experienced near a hand wheel of the steering system; and
adjusting a viscosity of a damping fluid of a vibration attenuation system disposed within a housing coupled to a rim of the hand wheel based on the accelerometer data, the housing including at least a first chamber in communication with a second chamber and the vibration attenuation system including a mass, the damping fluid flowing between the first chamber and the second chamber and the mass disposed in the second chamber.

15. The method of claim 14, wherein the damping fluid is a magneto-rheological fluid and adjusting the viscosity of the damping fluid further comprises:
varying an amount of current applied from a power supply to one or more plates positioned adjacent to the damping fluid.

16. The method of claim 14, wherein receiving the accelerometer data further comprises:
receiving angular accelerometer data from an angular accelerometer coupled to a steering shaft of the steering system.

* * * * *